United States Patent Office 3,081,279
Patented Mar. 12, 1963

3,081,279
METHOD OF VULCANIZING BUTYL RUBBER, HALOSULFONATED POLYETHYLENE, AND N-METHYL-N-NITROSO-P-NITROSOANILINE COMPOSITION AND RESULTING VULCANIZATE
David R. Hammel, Colonia, and Conrad J. Jankowski, Metuchen, N.J., assignors to Esso Research and Engineering Company, a corporation of Delaware
No Drawing. Filed July 31, 1959, Ser. No. 830,693
5 Claims. (Cl. 260—45.5)

The invention relates to a method for increasing the wear resistance of a rubbery polymer and more particularly it is concerned with the improved vulcanizate therefrom.

In the past when a rubbery polymer such as butyl rubber has been employed as a bead insulation, certain undesirable properties have occurred such as high green (uncured) stiffness and poor scorch life due to high carbon black loadings. Furthermore the processing of this polymer is difficult which limits the use of the rubber for commercial items, e.g., V-belts and floor tile.

It has now been discovered that these aforementioned problems can be overcome by incorporating a halosulfonated polyolefin and an active chemical, such as N-methyl N-nitroso p-nitroso aniline, therein. Thus in accordance with the instant invention a rubbery polymer, e.g., butyl rubber, is prepared and subsequently compounded with various ingredients including a halosulfonated polyolefin and N-methyl N-nitroso p-nitroso aniline. This compounded rubber is then cured to provide an improved vulcanizate therefrom.

The rubbery compounds to which this invention is applicable are any unsaturated rubber such as butyl rubber, natural rubber, neoprene, SBR (the copolymer of major amounts of butadiene and minor amounts of styrene), and ABR (the copolymer of butadiene and acrylonitrile). Butyl rubber is preferred.

The butyl rubber polymer is prepared by reacting 70 to 99.5 parts by weight, preferably 85 to 99.5, of an isoolefin with 30 to 0.5 parts by weight, preferably 15 to 0.5, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene.

Mixture of monomers, preferably with 1 to 5 volumes of inert diluent, e.g., methyl chloride, should be cooled to a temperature between 0 and $-200°$ C. and it is preferred that the temperature range be between $-60°$ and $-130°$ C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins.

The polymerization reaction is rapid and the polymer precipitates out of the solution in the form of a slurry or flocculent white solid. The polymer, which is recovered and dried, has a Staudinger molecular weight between 20,000 and 150,000, preferably 45,000 to 60,000; and an iodine number between 0.5 and 50, preferably between 1 and 15. The preparation of this copolymer is described in U.S. Patent No. 2,356,128.

The butyl rubber, similarly to other rubbers, can be compounded with various other materials. Some examples of the types of materials that can be incorporated are as follows: stabilizers, plasticizers, fillers, accelerators, softeners, catalysts, and cross-linking agents. Compounding may be accomplished by subjecting the rubber to a severe mixing treatment in a Banbury mill at a temperature range of 75° F. to 500° F. This drastic treatment homogenizes the polymer and removes foci of impurities. Some compounding ingredients may be added during the working in this mill. The treated polymer can then be worked on an open-roll mill with the addition of other compounding ingredients. A halogenated derivative of butyl rubber, e.g., chlorinated or brominated butyl rubber, is within the purview of this invention. The preferred range of halogen in the rubber structure is from 0.9 to 1.5 weight percent for chlorinated butyl rubber and 1.5 to 3.0 weight percent for brominated butyl rubber.

In accordance with this invention, the rubbery polymer, e.g., butyl rubber, is also compounded with a halosulfonated polyolefin in which the halogen is selected from the group consisting of chlorine and bromine; and the olefin advantageously contains 2 to 5 carbon atoms per molecule, e.g., ethylene, propylene, butene, and the like. The preferred compound is chlorosulfonated polyethylene which has the trade name Hypalon.

The chlorosulfonated polyethylene, or more broadly the halo-sulfonated polymer of an aliphatic olefin, to be used according to the present invention, may be prepared according to U.S. Patent No. 2,212,786. The polymer should be a normally solid polymer of an olefin of about 2–5 carbon atoms, e.g., ethylene, propylene, isobutylene, etc., and should have a molecular weight of at least 1,000, and preferably at least 5,000, e.g., 10,000; 20,000; or up to 40,000 or higher. The preparation of the halosulfonated derivatives of these hydrocarbon starting materials can be carried out in various ways. One of the simplest is to dissolve the polymer in a suitable solvent such as carbon tetrachloride, and to treat the resulting solution with a mixture of gaseous sulfur dioxide and chlorine. Bromine may also be used as halogen. Sulfonyl chloride, $SO_2Cl$ or sulfuryl chloride $SO_2Cl_2$, may also be used. In using $SO_2$ and $Cl_2$, it is preferable to use about 3–6 parts of $SO_2$ per 1 part of $Cl_2$. The resulting chlorosulfonated polymer contains about 0.1 to 10%, preferably about 0.3–8% of sulfur, and about 10–60%, preferably about 15–50% of chlorine.

A specific example of a suitable chlorosulfonated polyethylene is one made from a commercial polyethylene having a mol. wt. of about 20,000, and chlorosulfonated to about 29% Cl and 1.25% S. The halosulfonated polyolefin, such as chlorosulfonated polyethylene, is generally incorporated within the range of 5 to 50 parts, preferably 5 to 25 parts, per 100 parts of rubber (phr.).

In addition to the halosulfonated polyolefin heretofore described, it is necessary to incorporate an active chemical compound as a heat interaction promoter, e.g., N-methyl N-nitroso p-nitroso aniline (Elastopar), N-ethyl N-nitroso p-nitroso aniline, and p-dinitrosobenzene (Polyac). These compounds are advantageously included in amounts between 0.12 and 4 parts, preferably 0.5 and 2 parts, phr.

The compounded rubber with the halosulfonated polyolefin and N-methyl N-nitroso p-nitroso aniline therein is subsequently cured by any known method such as steam, pressure or mold curing. A particularly satisfactory method is to cure the compounded rubbery polymer in molds at a temperature between 137° C. and 183° C. for 1 minute to 4 hours.

Thus in accordance with this invention, a vulcanizate is obtained therefrom with increased resistance to chipping and wear and with improved recovery after indentation. Therefore, the modified rubber can be used in rubber mallets and floor tile where these characteristics are important. Furthermore, the improved processability of the vulcanizate enables the end product to be employed in V-belts and/or in a bead insulation for a rubber tire.

The following example is submitted to illustrate but not to limit this invention:

Example I

One hundred parts of the copolymer comprising 98% isobutylene with 2% isoprene were compounded with the ingredients herebelow to eventually form vulcanizates A, B, and C.

| Compound | A | B | C |
|---|---|---|---|
| Suprex Clay [a] | 100 | 100 | 100 |
| Stearic Acid | 2 | 2 | 2 |
| Hypalon S2 [b] | 5 | 5 | ----- |
| Elastopar [c] | ----- | ----- | 1 |
| Zeolex [d] | 50 | 50 | 50 |
| Laminar [e] | 50 | 50 | 50 |
| Titanox A-LO [f] | 20 | 20 | 20 |
| Necton 60 [g] | 10 | 10 | 10 |
| Tellurac [h] | 1 | 1 | 1 |
| Tuads [i] | 1 | 1 | 1 |
| Zinc Oxide | 5 | 5 | 5 |
| Magnesium Oxide | 10 | 10 | 10 |
| Spider Sulfur [j] | 2 | 2 | 2 |

[a] Aerfloated hard china kaolin.
[b] Chlorosulfonated polyethylene.
[c] N-methyl N-nitroso p-nitroso aniline.
[d] Precipitated hydrated sodium silicate aluminate.
[e] Ground oyster shells (98% Calcium carbonate).
[f] Titanium dioxide (Anatase-Low oil absorption).
[g] Naphthenic mineral oil.
[h] Tellurium diethyl dithiocarbamate.
[i] Tetramethyl thiuram disulfide.
[j] Fine particle size for better dispersion of sulfur.

The mixing cycle is as follows:

0 min.—polymer+hypalon S2+stearic acid+elastopar (if used)
1 min.—⅓ fillers+tritanox A-LO
2 mins.—⅓ fillers+zinc oxide
3 mins.—⅓ fillers+oil
5 mins.—clean ram Allow temperature to increase to about 300° F. for one minute then dump and add curatives (including magnesium oxide on cold mill).

The compounded butyl rubber was subsequently cured in a steam press at a temperature of 150° C. for 20–30 minutes. The following characteristics were noted:

| | A | B | C |
|---|---|---|---|
| Shore "A" Hardness | 83 | 83 | 75. |
| Surface | Nontacky | Nontacky | Tacky. |
| Permanent Deformation and/or Indentation. | High | Low | Very High. |

This example demonstrates the improvement in recovery after indentation when both a chlorosulfonated polyethylene and a heat interaction promoter are mixed with butyl rubber. This improvement is a direct result of the formation of a true dynamically sound covulcanizate. The all butyl compound or the butylhypalon compound without heat promoter therein did not show this superior performance.

Having described the general nature and specific embodiments of the present invention, the true scope is now particularly pointed out in the appended claims.

What is claimed is:

1. A method of producing a vulcanizate with increased resistance to wear and improved recovery after indentation which comprises:

(a) compounding 100 parts of a butyl rubber copolymer said copolymer comprising 70 to 99.5 parts by weight of a $C_4$ to $C_7$ isoolefin and 30 to 0.5 parts by weight of a multiolefin, with 5 to 50 parts of a halosulfonated polyolefin selected from the group consisting of chlorosulfonated polyethylene and bromosulfonated polyethylene, and 0.12 to 4 parts of N-methyl-N-nitroso-p-nitroso aniline; and (b) curing said compounded rubbery copolymer in a mold at a temperature between 137° C. and 183° C. for one minute to four hours.

2. The method of claim 1 in which the halosulfonated polyolefin is chlorosulfonated polyethylene.

3. The method of claim 1 in which the halosulfonated polyolefin is bromosulfonated polyethylene.

4. The method of claim 1 in which the butyl rubber copolymer has been modified to incorporate a halogen selected from the class consisting of chlorine and bromine in its structure.

5. The vulcanizate of claim 1.

References Cited in the file of this patent
UNITED STATES PATENTS

| | | |
|---|---|---|
| 2,683,103 | Smook et al. | July 6, 1954 |
| 2,729,608 | Strain | Jan. 3, 1956 |
| 2,749,323 | Schaefer et al. | June 5, 1956 |
| 2,874,743 | Rowe | Feb. 24, 1959 |

OTHER REFERENCES

Doak et al.: Can. J. Technol., 33, pages 98–109 (1955).
Kovacic: Bisalkylation Theory of Neoprene Vulcanization, Ind. Eng. Chem., 47, pages 1090–4 (1955).
Whitby: Synthetic Rubber (1956), John Wiley and Sons, Inc. New York, pages 850 and 887 relied on.